(12) United States Patent
Kim et al.

(10) Patent No.: US 10,104,744 B2
(45) Date of Patent: Oct. 16, 2018

(54) INFRARED MODULATING ELECTRO-FLUORESCENCE DEVICE

(71) Applicant: University—Industry Foundation, Yonsei University, Seoul (KR)

(72) Inventors: Eunkyoung Kim, Seoul (KR); SeogJae Seo, Gumi-si (KR); Chihyun Park, Suwon-si (KR)

(73) Assignee: University-Industry Foundation, Yonsei University, Seoul (KR)

( * ) Notice: Subject to any disclaimer, the term of this patent is extended or adjusted under 35 U.S.C. 154(b) by 648 days.

(21) Appl. No.: 14/601,898

(22) Filed: Jan. 21, 2015

(65) Prior Publication Data

US 2015/0208483 A1 Jul. 23, 2015

(30) Foreign Application Priority Data

Jan. 23, 2014 (KR) .................. 10-2014-0008459

(51) Int. Cl.
*H05B 33/14* (2006.01)
*H05B 33/26* (2006.01)
*C09K 11/06* (2006.01)

(52) U.S. Cl.
CPC .............. *H05B 33/14* (2013.01); *C09K 11/06* (2013.01); *H05B 33/26* (2013.01); *C09K 2211/1044* (2013.01); *C09K 2211/1048* (2013.01); *C09K 2211/1051* (2013.01); *C09K 2211/1055* (2013.01); *C09K 2211/1074* (2013.01)

(58) Field of Classification Search
CPC ......... H05B 33/14; H05B 33/26; C09K 11/06
See application file for complete search history.

(56) References Cited

U.S. PATENT DOCUMENTS

| 5,554,318 A * | 9/1996 | Neumann .............. G01N 21/91 252/301.19 |
| 7,547,721 B1 | 6/2009 | Miwa et al. |
| 2004/0166364 A1 | 8/2004 | Kathirgamanathan |

FOREIGN PATENT DOCUMENTS

| JP | 2004026784 A | 1/2004 |
| KR | 20080027430 A | 3/2008 |
| KR | 10-2011-0057837 A | 6/2011 |
| KR | 10-2012-0069914 A | 6/2012 |

OTHER PUBLICATIONS

Machine Translation of KR 2008-0027430, Downloaded Feb. 17, 2018.*
Zaumseil et al.; "Electroluminescence from Electrolyte-Gated Carbon Nanotude Field-Effect Transistors"; ACS Nano; 2009; pp. 2225-2234; vol. 3, No. 8.

* cited by examiner

*Primary Examiner* — Joseph R Kosack
(74) *Attorney, Agent, or Firm* — The Webb Law Firm

(57) ABSTRACT

The present invention relates to an electro-fluorescence device which includes an electro-active infrared fluorescence compound or a mixture including these compounds, and an electrolyte, such that an infrared light emitting signal is controlled by selecting and supplying a power source, which may induce electrical oxidation and reduction, so as to switch the infrared fluorescence. The low-voltage driven infrared signal modulating device of the present invention may be driven at 3 V or less, and thus may be applied for the use of an infrared biosensor, an infrared security signal generator, and an infrared signal disturbance.

15 Claims, 2 Drawing Sheets

INFRARED MODULATING ELECTRO-FLUORESCENCE DEVICE

CROSS-REFERENCE TO RELATED APPLICATION

This application claims priority to Korean Patent Application No. 10-2014-0008459 filed Jan. 23, 2014, the disclosure of which is hereby incorporated in its entirety by reference.

TECHNICAL FIELD

The present invention relates to an infrared modulating electro-fluorescence device, and more particularly, to an electro-fluorescence device which includes an infrared fluorescence material capable of being oxidized and reduced, and of which infrared fluorescence is controlled by the applied voltage.

BACKGROUND ART

An electro-fluorescence device is a device which may switch fluorescence off and on by the oxidation and reduction of an electro-active material which is introduced into the device by the applied voltage. The characteristics of the electro-fluorescence device are that an electro activator receives energy at an excited energy level of a fluorescence material, thereby leading to a fluorescence extinction or shift of the wavelength, and that it is possible to control the reception of energy from the fluorescence material according to the oxidation and reduction of the electro activator. The electro-fluorescence device may be largely classified into a type in which an electro-active part is included in the fluorescence material, and a type in which a fluorescence material and an electro-active material are each included in the device.

As a technology in the related art, there was a device in which electro-fluorescence characteristics are implemented by singly using an aromatic compound including anthracene, biphenyl ether, biphenyl alkylene, biphenyl sulfide, naphthalene, pyrene, perylene, pentacene, tetrazine and derivatives thereof, a triazine-based compound, and a triazineoxyphenyl-based compound, or additionally using an electro-active material such as ferrocene, benzoquinone, and iodide.

In particular, electro-active fluorescence monomers and polymers may have a stable energy transfer structure without limitation in concentration, and implement various fluorescence colors through molecular structure design, so that studies for these monomers and polymers as a fluorescence display device and a functional bioimaging material have been actively conducted.

For the application to the functional bioimaging and fluorescence display device, studies of controlling the fluorescence intensity at various wavelength ranges have been conducted, and materials with various wavelength regions such as, for example, a polyoxadiazole-based polymer (335 nm, blue fluorescence), a tetrazine-based compound (558 nm, yellow fluorescence), a quantum dot (600 nm, red fluorescence) have been studied, but most of the studies implement the control of fluorescence with a visible light region, and a device which controls the wavelength with an infrared region range has never been suggested.

Light at an infrared region has good tissue penetration and is generally innocuous to cells, and thus has been actively applied in bioengineering such as bioimaging, and a photothermal therapy. In the case of Korean Patent Application Laid-Open Nos. 10-2011-0057837 and 10-2012-0069914, light at the infrared region has been applied in order to complement information which may be obtained with the visible light in a night vision enhancement device and a thermal imaging camera.

In the case of an organic material, fluorescence at the infrared region is observed from an organic compound, such as cyanine-, squaraine-, and porphyrin-based compounds, in which a conjugated structure is longitudinally connected, and in the case of an inorganic material, fluorescence at the infrared region is observed from a quantum dot formed of PbS and PbSe and an Er-based metal complex, and is actively applied as bioimaging.

As a method of controlling an infrared light emitting signal in the related art, there was a method of injecting a fluorescence extinguisher derivative such as an active oxygen species in the process of delivering energy to a fluorescence material in the bioimaging, and in the case of injecting a fluorescence extinguisher derivative, the fluorescence extinguisher derivative is suitable as a one-time sensing, but it is difficult to use the derivative several times. As a device for electrically generating an infrared signal, an infrared LED and OLED may be used, but this device is an electro light-emitting device, and thus has high driving voltage and power consumption.

SUMMARY OF THE INVENTION

Accordingly, the present invention has been made in an effort to provide an infrared modulating electro-fluorescence device which may implement switching on and off of fluorescence of cells, the device including an electro-fluorescence material in the infrared bioimaging, by including an infrared fluorescence compound or a mixture composed of these compounds to enable control of the low-voltage driven infrared light emission.

The present invention has also been made in an effort to provide an infrared modulating electro-fluorescence device which may be utilized as an infrared display device which may be identified by a night vision enhancement device, and an infrared signal disturbing device, and may be driven at low voltage and low power.

An electro-fluorescence device according to an exemplary embodiment of the present invention is a two-electrode device and may include: a first electrode; a second electrode disposed apart from the first electrode; and an electrolyte layer disposed between the first electrode and the second electrode and including an infrared fluorescence compound.

An electro-fluorescence device according to another exemplary embodiment of the present invention is a three-electrode device and may include: a first electrode; a second electrode disposed apart from the first electrode; a reference electrode disposed between the first electrode and the second electrode; and an electrolyte layer disposed between the first electrode and the second electrode and including an infrared fluorescence compound.

An electro-fluorescence device according to still another exemplary embodiment of the present invention has a transistor type structure and may include: a substrate; a first electrode formed on the substrate; a second electrode formed on the substrate and disposed apart from the first electrode; a third electrode formed on the substrate and disposed apart from the first electrode and the second electrode; and an electrolyte layer disposed among the first electrode, the second electrode, and the third electrode and including an infrared fluorescence compound.

In the present invention, the electrolyte layer may include one infrared fluorescence compound or a mixture of a plurality of infrared fluorescence compounds, and an electrolyte.

In the present invention, the electrolyte layer may include an infrared fluorescence compound and an electro-active material.

In the present invention, the infrared fluorescence compound may include one or a mixture of two or more selected from compounds represented by the following Formulae 1, 2, 3, and 4.

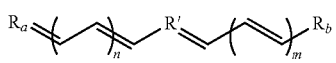
[Formula 1]

In Formula 1, $R_a$ and $R_b$ each independently represent a heterocyclic compound, R' represents vinylene, a triple bond (—C≡C—), —CH═CH-alkyl, —CH═CH-aryl, cycloalkylene, halo-alkyl-cycloalkylene, hydroxy-cycloalkylene, or hydroxy-alkyl-cycloalkylene, and n and m are each independently an integer of 0 or more.

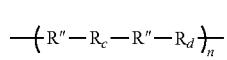
[Formula 2]

In Formula 2, $R_c$ represents a heterocyclic compound, $R_d$ represents an aromatic ring, R" each independently represents a direct bond, vinylene, a triple bond (—C≡C—), —CH═CH-alkyl, —CH═CH-aryl, cycloalkylene, thiophene, oxazole, or selenophene, and n is an integer of 1 or more.

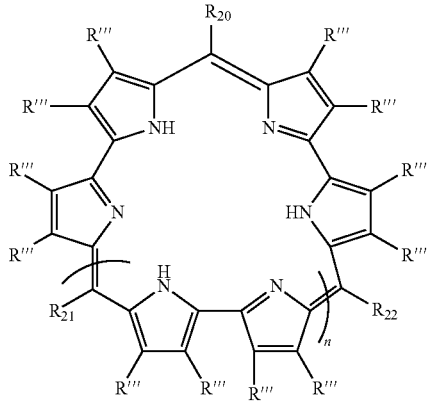
[Formula 3]

In Formula 3, $R_{20}$ to $R_{22}$ each independently represent hydrogen, alkyl, aryl, alkoxy, vinyl, or cycloalkyl, R''' each independently represents hydrogen, alkyl, aryl, alkoxy, or a fused aromatic ring, and n is an integer of 0 or more.

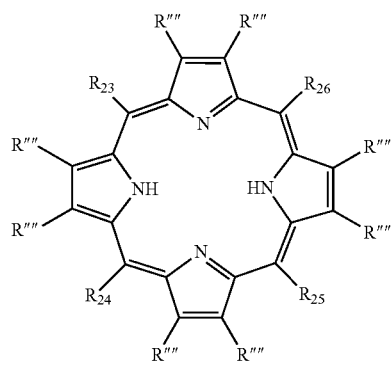
[Formula 4]

In Formula 4, $R_{23}$ to $R_{26}$ each independently represent hydrogen, alkyl, aryl, alkyl aryl, aryl alkyl, haloalkyl aryl, alkoxy, vinyl, or cycloalkyl, and R'''' each independently represents hydrogen, alkyl, aryl, alkoxy, or a fused aromatic ring.

In Formula 1, $R_a$ and $R_b$ each independently represent a heterocyclic compound selected from

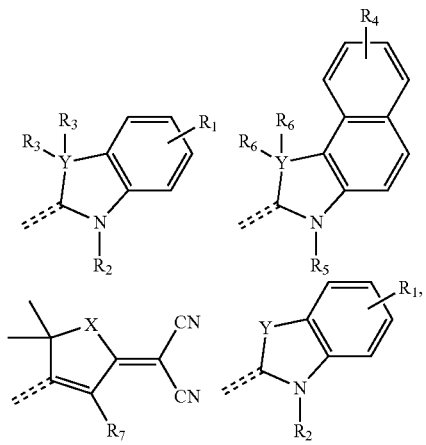

$R_1$ to $R_7$ each independently represent hydrogen, alkyl, aryl, aryl alkyl, alkyl aryl, alkyl ester, alkyl aryl alkyl ester, cycloalkyl, alkoxy, or silyl, X and Y each independently represent an atom selected from C, S, O, and N, and the dotted line represents a linking moiety.

In Formula 2, $R_c$ represents a heterocyclic compound selected from

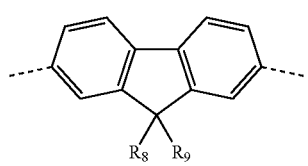

-continued

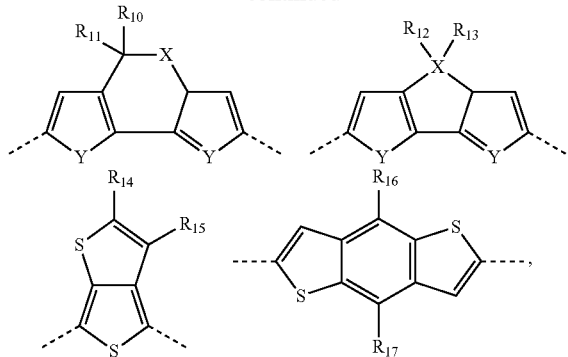

$R_8$ to $R_{17}$ each independently represent hydrogen, alkyl, aryl, alkyl ester, alkoxy, or silyl, X and Y each independently represent an atom selected from C, S, O, N, and Si, and the dotted line represents a linking moiety.

In Formula 2, $R_d$ represents an aromatic ring selected from benzothiadiazole, azulene, indene, benzofuran, and

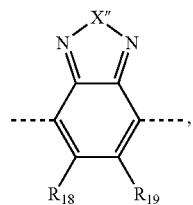

$R_{18}$ and $R_{19}$ each independently represent hydrogen, halogen, alkyl, or aryl, X" represents an atom selected from S, Se, and O, and the dotted line represents a linking moiety.

In the present invention, the electrolyte layer may be in the form of a thin film.

In the present invention, the electrolyte layer may include an electrolyte salt selected from tetrabutylammonium hexafluorophosphate (TBAPF$_6$, n-Bu$_4$NPF$_6$), lithium bistrifluoromethanesulfonimidate (LiTFSI, C$_2$F$_6$LiNO$_4$S$_2$), tetrabutylammonium iodide (TBAI), tetrabutylammonium perchlorate (TBAP, n-Bu$_4$NClO$_4$), lithium perchlorate (LiClO$_4$), sodium tetrafluoroborate (NaBF$_4$), lithium hexafluorophosphate (LiPF$_6$), lithium tetrafluoroborate (LiBF$_4$), lithium trifluoromethanesulfonate (LiCF$_3$SO$_3$), potassium hexacyanoferrate (K$_4$Fe(CN)$_6$), and lithium bisperfluoroethane sulfonyl imide (LiBETI, LiN(SO$_2$C$_2$F$_5$)$_2$).

In the present invention, the electrolyte layer may include an electro-active compound selected from benzoquinone, ferrocene, hydrobenzoquinone, naphthoquinone, I$_2$, and KI$_3$.

In the present invention, the electrolyte layer may include a solvent selected from methylene chloride, chloroform, acetonitrile, ethylene carbonate, propylene carbonate, tetrahydrofuran, butylene carbonate, polyethylene glycol, ethylene glycol, tetrachloroethene, styrene, alpha-methyl styrene, and xylene.

In the present invention, the electrolyte layer may include an organic material including an acryloyl group, an epoxy group, a vinyl group, or a methacryloyl group.

The electro-fluorescence device according to the present invention may control an infrared signal by an oxidation-reduction reaction at a direct current or alternating current voltage within ±3 V.

In the present invention, the electrolyte layer may include a liquid electrolyte in which an electrolyte salt is dissolved, a gel electrolyte, a solid electrolyte, or a polyelectrolyte.

Two or more of the electro-fluorescence device according to the present invention may constitute one pixel.

The electro-fluorescence device according to the present invention may implement the complete switching on and off of fluorescence, may implement a fluorescence intensity, which is not a complete switching on and off, but an intermediate level, by controlling the voltage, and may form an intermediate step even in the control of an infrared signal according to the oxidation and reduction state which may be formed when the voltage is given a value between the oxidation reduction maximum potentials.

According to the present invention, it is possible to manufacture an infrared electro-fluorescence device by a simple process, and to provide an infrared imaging system and an infrared display device, which may control infrared light emission by a low-voltage driving and a low-power switching. Further, according to the present invention, there is an economic effect in that, as compared to the existing infrared display device, it is possible to reduce the number of processes, to simply control the infrared signal by minimizing the power consumption, to simply control the intensity of infrared light emission according to the regulation of voltage, and to efficiently implement a security signal and a signal disturbance which may be confirmed in a night vision enhancement system through an infrared filter.

DETAILED DESCRIPTION

Figure 1:
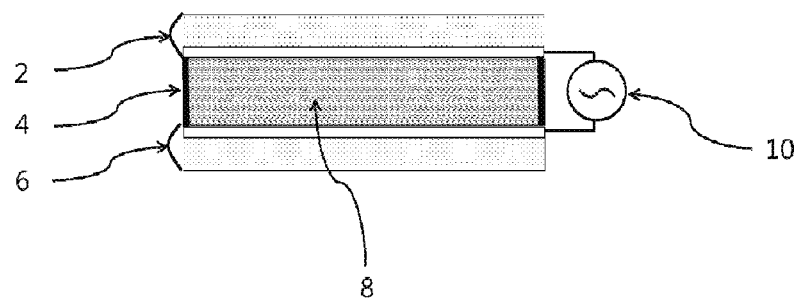
FIG. 1 is a diagram schematically illustrating an infrared modulating fluorescence device with a two-electrode structure according to an exemplary embodiment of the present invention.

Hereinafter, the present invention will be described in detail.

An infrared electro-fluorescence device according to the present invention may include: an electrolyte layer including an infrared fluorescence material; and a plurality of electrodes disposed at a predetermined interval.

The structure of the electro-fluorescence device mentioned in the present invention refers to an electrochemical device which includes a working electrode and a counter electrode, and into which a reference electrode may be additionally inserted, and is not particularly limited as long as the device is typically used in the art, and may adopt a structure in which a working electrode and a counter electrode are oriented at the upper and lower portions, and a structure in which a working electrode, a counter electrode, and a reference electrode are oriented at the upper and lower portions, or a transistor structure in which a working electrode, a counter electrode, and a reference electrode are oriented as a plane.

The size of the device may be several micrometers to several meters according to the size of the electrode, and is not particularly limited. The distance between the electrodes is a size which may be typically processed, is in a range of preferably 50 nm to 10 cm, and is not particularly limited.

The electrode may be a transparent electrode, and may be, for example, an indium tin oxide (ITO) transparent electrode. The electrode may be formed on a substrate such as glass and plastic. The substrate may be transparent.

The electrode may be composed of two electrodes of a working electrode and a counter electrode, may be composed of three electrodes of a working electrode, a counter electrode, and a reference electrode, or may be a transistor-type composed of a source, a drain, and a gate.

The reference electrode may be introduced in order to set a reference voltage of a voltage applied to the working electrode. As an electrode typically used in the art as the reference electrode, a silver (Ag) wire, Ag/AgCl, a normal hydrogen electrode, a saturated calomel electrode, and the like may be preferably used. The reference electrode may be disposed between the working electrode and the counter electrode.

The electrolyte layer (fluorescence layer) may be formed between the working electrode and the counter electrode. The electrolyte layer may include a liquid electrolyte in which an electrolyte salt is dissolved, a gel electrolyte, a solid electrolyte, or a polyelectrolyte. The electrolyte layer may be in the form of a thin film. The thickness of the electrolyte layer is not particularly limited, and may be, for example, 10 nm to 1,000 μm. The method of preparing an electrolyte layer is not particularly limited, and it is possible to use, for example, a method of injecting an electrolyte solution, or a method of bar-coating the electrolyte solution, and then curing the solution.

An infrared fluorescence material used in the electrolyte layer refers to a material which exhibits a phenomenon of controlling light emission by electrical stimulation, and in the case of an organic dye, it is possible to use, for example, a cyanine dye, a squaraine dye, phthalocyanine and porphyrin derivatives, BODIPY (boron-dipyrromethene), and the like, in the case of an inorganic material, a quantum dot using PbS and PbSe as a central structure, erbium ($Er^{3+}$), praseodymium ($Pr^{3+}$-) and the like may be used, and at least one or a mixture of two or more thereof among them may be used.

An absorption wavelength region of the infrared fluorescence material may include ultraviolet rays (10 to 397 nm), visible lights (380 to 770 nm), and an infrared wavelength region (750 nm to 1 mm). Further, the light emission (fluorescence) wavelength region of the infrared fluorescence material may be 600 nm or more, preferably 670 nm or more, and more preferably 750 nm, and the upper limit thereof may be 1 mm.

The electrolyte layer may optionally additionally include an electro-active material. As the electro-active material, for example, benzoquinone, ferrocene, hydrobenzoquinone, naphthoquinone, $I_2$, $KI_3$ and the like may be used.

The electrolyte layer may include one or more selected from an electrolyte salt, an organic solvent, and an organic material. As the electrolyte salt, lithium perchlorate, tetrabutylammonium iodide (TBAI), tetrabutylammonium perchlorate (TBAP), and the like may be used. As the organic solvent, chloroform, tetrachloroethene, acetonitrile, propylene carbonate, styrene, alpha-methyl styrene, xylene and the like may be used. As the organic material, an organic material including an acryloyl group, an epoxy group, a vinyl group, or a methacryloyl group may be used.

The electro-fluorescence device according to the present invention may include a power source unit which is electrically connected to a working electrode and a counter electrode to apply voltage. The fluorescence intensity may be varied by variation in voltage applied from the power source unit, and the applied voltage may be controlled such that the variation rate of the infrared fluorescence intensity is controlled according to the variation rate of the voltage applied to the power source unit. The voltage applied to a transparent electrode by the power source unit is within ±3 V, and may be direct current or alternating current.

The electro-fluorescence device according to the present invention may include a spacer which hermetically seals the electrolyte layer while maintaining the interval between the electrodes.

The electro-fluorescence device according to the present invention may control an infrared signal by an oxidation-reduction reaction at a voltage within ±3 V. In addition, two or more devices may constitute a pixel.

The electro-fluorescence device according to the present invention may implement the complete switching on and off of fluorescence, may implement a fluorescence intensity, which is not a complete switching on and off, but an intermediate level, by controlling the voltage, and may form an intermediate step even in the control of an infrared signal according to the oxidation and reduction state which may be formed when the voltage is given a value between the oxidation reduction maximum potentials. For example, the complete 0 (fluorescence extinction) or 1 (bright fluorescence) may be implemented by applying the maximum voltage, and the intermediately bright state, which is not the complete switching off and on, but is therebetween, may be formed of a gray zone which may be formed when the voltage is given a value between the oxidation reduction maximum potentials.

Incident light may be incident in order to emit light from the electro-fluorescence device. The wavelength region of the incident light may include preferably an absorption wavelength region of the fluorescence material. Preferably, the incident light may be light from a multiwavelength lamp including the absorption wavelength of the fluorescence material, and a common lamp may also be used.

Preferably, an infrared electro-fluorescence display with passive and active matrices may be provided through patternization and pixelization processes of the electro-fluorescence device.

Hereinafter, the present invention will be described in detail with reference to the accompanying drawings.

FIG. 1 schematically illustrates an infrared modulating fluorescence device with a two-electrode structure according to an exemplary embodiment of the present invention, and the two-electrode electro-fluorescence device according to the present exemplary embodiment may include a first electrode 2, a spacer 4, a second electrode 6, an electrolyte layer 8, and a power source unit 10.

The electrodes 2 and 6 may be a transparent electrode such as ITO, and may be formed on a glass or plastic substrate. One of the electrodes 2 and 6 may be a working electrode, and the other may be a counter electrode.

As the spacer 4, a polyimide tape and the like may be used.

The electrolyte layer 8 may include one or more from an infrared fluorescence material, an electrolyte, an electroactive material, a solvent, and an organic material. When a thin film may be prepared using the fluorescence material, the fluorescence material may be used by being applied on a transparent electrode substrate.

As the power source unit 10, direct current or alternating current may be used.

Figure 2:
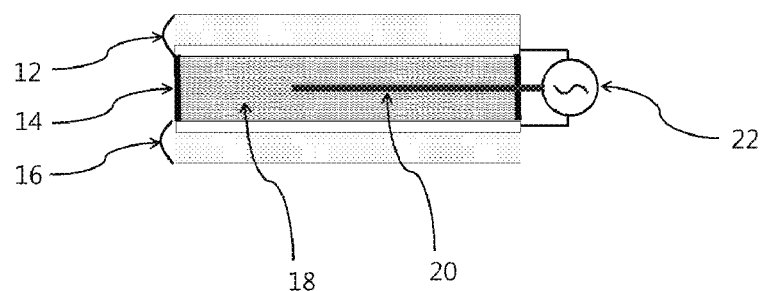
FIG. 2 is a diagram schematically illustrating an infrared modulating fluorescence device with a three-electrode structure according to another exemplary embodiment of the present invention.

FIG. 2 schematically illustrates an infrared modulating fluorescence device with a three-electrode structure according to another exemplary embodiment of the present invention, and the three-electrode electro-fluorescence device according to the present exemplary embodiment may include a first electrode 12, a spacer 14, a second electrode 16, an electrolyte layer 18, a reference electrode 20, and a power source unit 22. When compared with the two-electrode device in FIG. 1, the device in FIG. 2 is a form in which the reference electrode 20 is added.

The reference electrode 20 is introduced in order to set a reference voltage of the voltage applied to the working electrode, and it is possible to use, for example, a silver wire, Ag/AgCl, a standard hydrogen electrode, a saturated calomel electrode, and the like.

Figure 3:
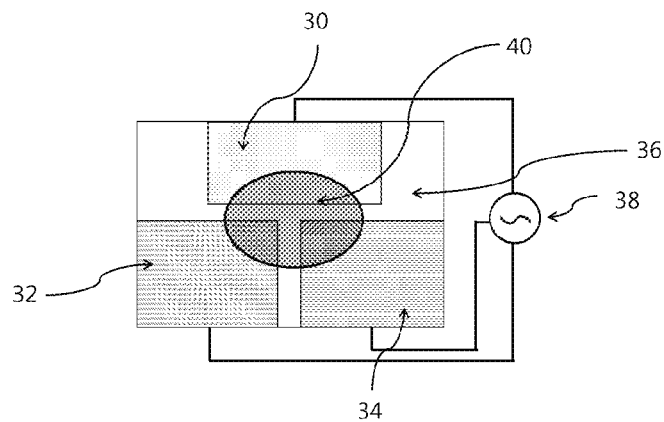
FIG. 3 is a diagram schematically illustrating an infrared modulating fluorescence device with a transistor-type structure according to still another exemplary embodiment of the present invention.

FIG. 3 schematically illustrates an infrared modulating fluorescence device with a transistor-type structure according to still another exemplary embodiment of the present invention, and the transistor device according to the present exemplary embodiment may include a first electrode 30, a second electrode 32, a third electrode 34, a substrate 36, a power source unit 38, and an electrolyte layer 40.

The electrodes 30, 32, and 34 may be an electrode pattern which is patterned on a substrate, and may each serve as a source, a drain, and a gate.

The substrate 36 may be a non-conductive substrate.

The electro-fluorescence material according to the present invention, or a mixture including these materials refers to a material in which the fluorescence light emission region is in the infrared wavelength region, and which has a phenomenon in which light is emitted by electrical stimulation, may be one or a mixture of two or more selected from a cyanine-based compound, a polymer having a conjugated structure, and a porphyrin-based compound, and may be preferably one or a mixture of two or more selected from compounds represented by the following Formulae 1, 2, 3, and 4.

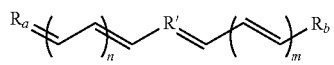

[Formula 1]

In Formula 1,
$R_a$ and $R_b$ each independently represent a heterocyclic compound,
R' represents vinylene, a triple bond (—C≡C—), —CH=CH-alkyl, —CH=CH-aryl, cycloalkylene, halo-alkyl-cycloalkylene, hydroxy-cycloalkylene, or hydroxy-alkyl-cycloalkylene, and
n and m are each independently an integer of 0 or more.
In Formula 1,
$R_a$ and $R_b$ each independently represent a heterocyclic compound selected from

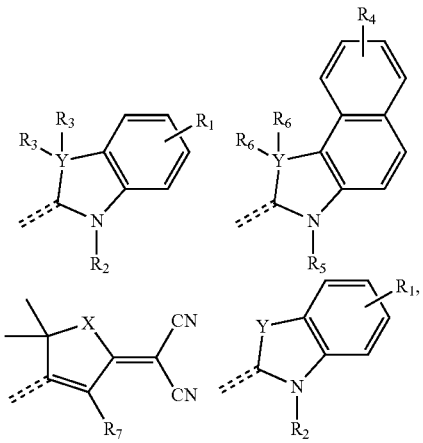

$R_1$ to $R_7$ each independently represent hydrogen, alkyl, aryl, aryl alkyl, alkyl aryl, alkyl ester, alkyl aryl alkyl ester, cycloalkyl, alkoxy, or silyl,
X and Y each independently represent an atom selected from C, S, O, and N, and
the dotted line represents a linking moiety.

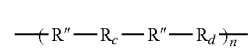

[Formula 2]

In Formula 2,
$R_c$ represents a heterocyclic compound,
$R_d$ represents an aromatic ring,
R" each independently represents a direct bond, vinylene, a triple bond (—C≡C—), —CH=CH-alkyl, —CH=CH-aryl, cycloalkylene, thiophene, oxazole, or selenophene, and
n is an integer of 1 or more.
In Formula 2,
$R_c$ represents a heterocyclic compound selected from

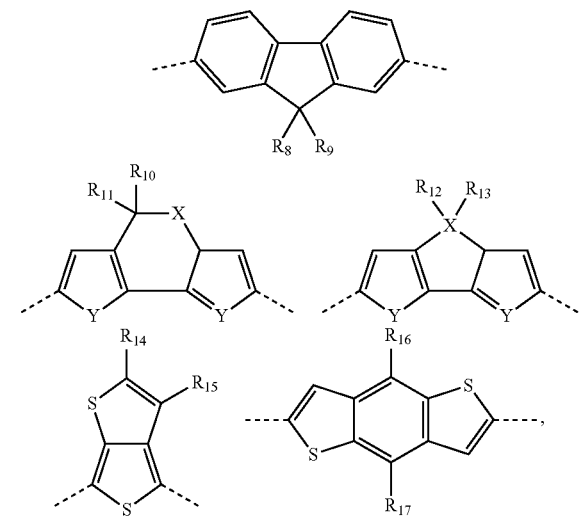

$R_8$ to $R_{17}$ each independently represent hydrogen, alkyl, aryl, alkyl ester, alkoxy, or silyl,
X and Y each independently represent an atom selected from C, S, O, N, and Si, and the dotted line represents a linking moiety.
In Formula 2,
$R_d$ represents an aromatic ring selected from benzothiadiazole, azulene, indene, benzofuran, and

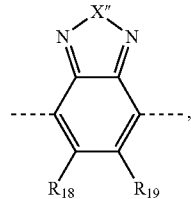

$R_{18}$ and $R_{19}$ each independently represent hydrogen, halogen, alkyl, or aryl,
X" represents an atom selected from S, Se, and O, and the dotted line represents a linking moiety.

[Formula 3]

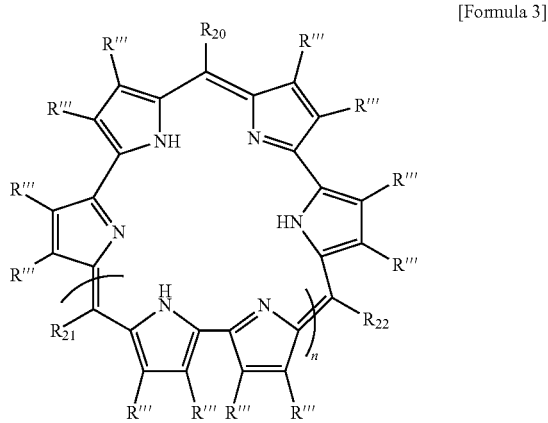

In Formula 3,
$R_{20}$ to $R_{22}$ each independently represent hydrogen, alkyl, aryl, alkoxy, vinyl, or cycloalkyl,
R'" each independently represents hydrogen, alkyl, aryl, alkoxy, or a fused aromatic ring, and
n is an integer of 0 or more.

[Formula 4]

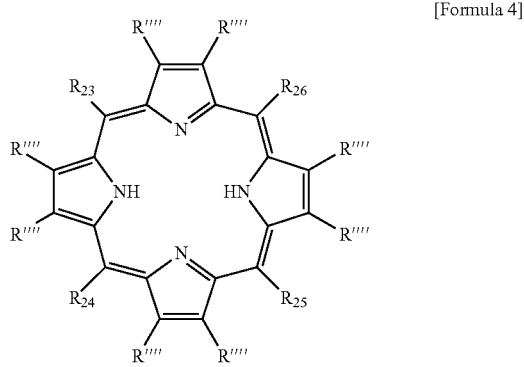

In Formula 4,
$R_{23}$ to $R_{26}$ each independently represent hydrogen, alkyl, aryl, alkyl aryl, aryl alkyl, haloalkyl aryl, alkoxy, vinyl, or cycloalkyl, and
R"" each independently represents hydrogen, alkyl, aryl, alkoxy, or a fused aromatic ring.

In Formulae 1 to 4, the number of carbon atoms included in each substituent such as alkyl and aryl may be each independently 1 to 30, and preferably 1 to 20. Further, in the formulae, the upper limit of n and m is not particularly limited, and may be, for example, $10^6$.

In Formulae 1 to 3, voltage is applied to the electrode substrates which face by the power source unit, and generates charge transfer of the electrolyte filled between both the electrodes and a spacer, and oxidation and reduction of the electro-active material. In this case, as an ion conductive electrolyte solution, a solution in which an electrolyte salt is dissolved may be used, and is applied or used in the manufacture of an electro-fluorescence device by a method such as vacuum entry.

The electrolyte solution may contain an electrolyte salt and a solvent.

The electrolyte salt is an electrolyte salt commonly used in the art, and is not particularly limited, and it is possible to use, for example, tetrabutylammonium hexafluorophosphate (TBAPF$_6$, n-Bu$_4$NPF$_6$), lithium bistrifluoromethanesulfonimidate (LiTFSI, C$_2$F$_6$LiNO$_4$S$_2$), tetrabutylammonium iodide (TBAI), tetrabutylammonium perchlorate (TBAP, n-Bu$_4$NClO$_4$), lithium perchlorate (LiClO$_4$), sodium tetrafluoroborate (NaBF$_4$), lithium hexafluorophosphate (LiPF$_6$), lithium tetrafluoroborate (LiBF$_4$), lithium trifluoromethanesulfonate (LiCF$_3$SO$_3$), potassium hexacyanoferrate (K$_4$Fe(CN)$_6$), and lithium bisperfluoroethane sulfonyl imide (LiBETI, LiN(SO$_2$C$_2$F$_5$)$_2$), and the like. As the electrolyte salt, one single compound or a mixture of two or more thereof may be used from the above-described materials.

The concentration of the electrolyte salt is 0.001 to 10 M, preferably 0.1 to 0.5 M. When the concentration of the electrolyte salt is less than 0.001 M, the switching on and off of fluorescence is not observed, and when the concentration is more than 10 M, a problem in that the compound is eluted from the solution occurs, so that it is preferred to maintain the above range.

As the solvent, it is possible to use a solvent used in the art, for example, one or more solvents selected from methylene chloride (dichloromethane), chloroform, acetonitrile, ethylene carbonate (EC), propylene carbonate (PC), tetrahydrofuran (THF), butylene carbonate, polyethylene glycol (PEG), ethylene glycol, tetrachloroethene, styrene, alpha-methylstyrene, xylene, and the like. The concentration of the solvent is 0.001 to 10 M, preferably 0.1 to 5 M.

As the polymer electrolyte, a composition including an electrolyte salt, an acrylate PEG, acrylate ethylene glycol, a cross-linker, an initiator (such as Darocure and Irgacure), and the like may be photocured with ultraviolet light, and used. As the acrylate PEG, it is possible to use polyethylene glycol diacrylate (PEGDA), polyethylene glycol dimethylether (PEGDMe), methacrylate of polyethylene glycol monomethyl ether (MPEGM), and the like.

The electrolyte layer may include an organic material including an acryloyl group, an epoxy group, a vinyl group, or a methacryloyl group, and may include, for example, polymethylmethacrylate (PMMA), polystyrene (PS), and the like.

The present invention relates to a low-power infrared light emitting signal modulating device driven at low voltage, which is obtained by introducing a composition which includes a fluorescence material that has electro-activity or has an energy transfer phenomenon with an electro-active material among infrared dyes, and includes an infrared fluorescence material having electro-activity or an electro-active material and an infrared fluorescence material, into an electro-fluorescence device. The present invention provides an infrared electro-fluorescence device, which has solved various problems such as control of light emission in an infrared region, which is difficult to be implemented by the existing electro-fluorescence device, and difficulties in high voltage driving of the existing infrared lamp and LED, and high-power consumption.

In the present invention, in order to solve difficulties in the process of manufacturing an infrared light emission modulating device and a problem of high voltage driving, and utilize infrared fluorescence as a functional bioimaging device, an infrared display device which may be identified by a night vision enhancement device, and an infrared signal disturbing device, an infrared fluorescence material having electro-activity is dissolved in an electrolyte, or is manufactured into a thin film, and then an electro-fluorescence device is manufactured, thereby manufacturing a device such that the switching on and off of fluorescence is implemented through the oxidation and reduction of an electro-active material by an external voltage.

The electro-fluorescence device according to the present invention may control an infrared light emitting signal by including an electro-active infrared fluorescence compound or a mixture of these compounds, and an electrolyte, and selecting and supplying a power source, which may induce electrical oxidation and reduction, so as to switch the infrared fluorescence, and when compared with the existing infrared display device, the number of processes may be reduced and power consumption may be minimized to simply control the infrared signal. Therefore, mass production and commercialization of the functional bioimaging and the infrared signal device is achieved. The electro-fluorescence device according to the present invention may be applied to an infrared bio sensor, an infrared security signal generator, and an infrared signal disturbing device.

A fluorescence material and a composition, which are introduced into the existing electro-fluorescence device, may control light emission in a visible light region, but there is difficulty in that the wavelength is not expanded into the infrared region, and the existing infrared signal device has problems such as complexity in the process and high-power driving. In order to solve the problem, the present invention provides an infrared electro-fluorescence device of which the manufacturing method is simple using an electro-active infrared fluorescence material and a composition, and which may be driven at low voltage. As compared to the existing infrared display device, it is possible to reduce the number of processes, to simply control the infrared signal by minimizing power consumption, to simply control the intensity of infrared light emission according to the regulation of voltage, and to efficiently implement a security signal and a signal disturbance which may be confirmed in a night vision enhancement system through an infrared filter.

EXAMPLES

<Test Method>

(1) Manufacture of two-electrode device: a spacer was attached to ITO glass using an imide tape, and used as a counter electrode. The counter electrode was covered with ITO glass on which an electrolyte composition including an electro-fluorescence material or an electro-fluorescence material was applied, thereby manufacturing a two-electrode device.

(2) Manufacture of three-electrode device: a spacer was attached to ITO glass using an imide tape, and an Ag wires were inserted between the imide tapes, and used as a counter electrode and a reference electrode. The electrodes were covered with ITO glass on which an electrolyte composition including an electro-fluorescence material or an electro-fluorescence material was applied, thereby manufacturing a three-electrode device.

(3) Manufacture of Transistor Device: a glass on which ITO was patterned and which was planarly aligned while being separated into three electrodes was used. An electrolyte including an electro-fluorescence material was applied thereon so as to be brought into contact with the three electrodes and used.

(4) Operating Voltage: measurement was performed on the fluorescence thin film by a cyclic voltammogram using a circulation potentiometer (CHI Co., Ltd.) in a three-electrode system, and then an operating voltage was set to a minimum voltage range.

(5) Fluorescence characteristics: measurement was performed on the fluorescence thin film by a luminescence spectrometer [luminescence spectrometer-Model LS55, PerkinElmer, USA].

(6) Switching: the fluorescence intensity was measured while alternately applying, for example, 1.1 V to −0.5 V within an operating voltage to a fluorescence thin film for 10 seconds. The repeating number until the fluorescence intensity of 90% or more was maintained was defined as a switching repetition.

Fluorescence materials used for manufacturing a fluorescence thin film in the following Examples, that is, fluorescence compounds are as follows.

[Formula 1-a]

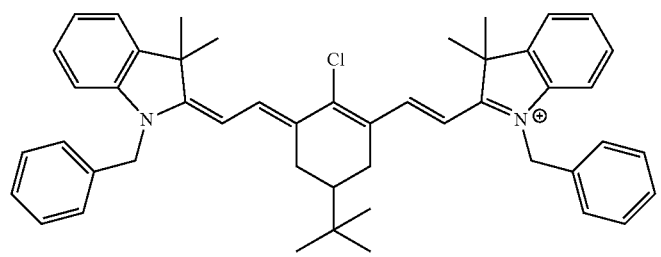

-continued
[Formula 1-b]
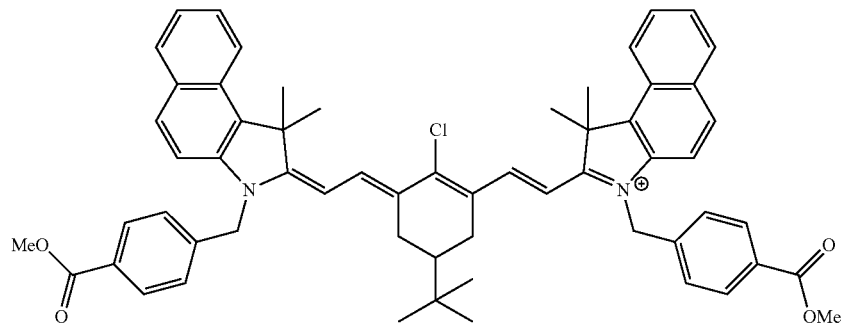
[Formula 1-c]
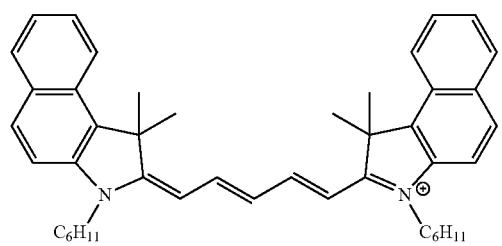
[Formula 1-d]
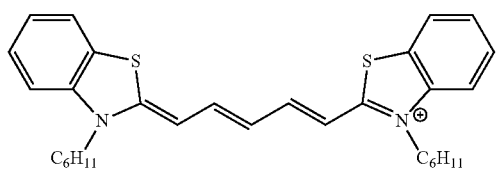
[Formula 1-e]
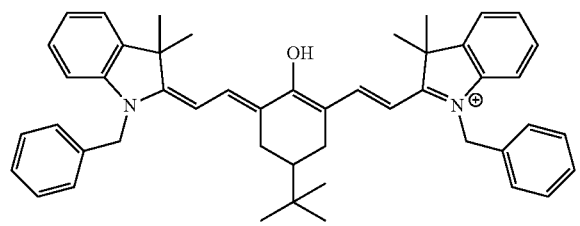
[Formula 1-f]
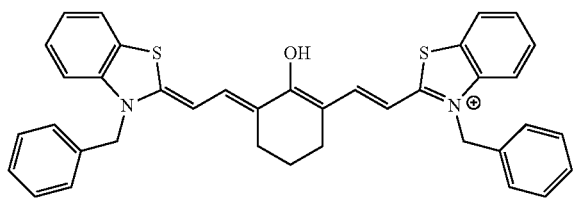
[Formula 2-a]
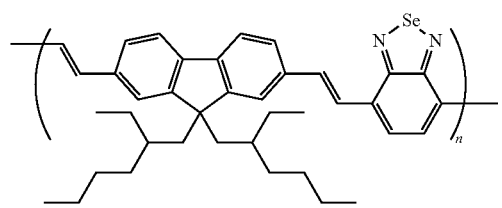
[Formula 2-b]
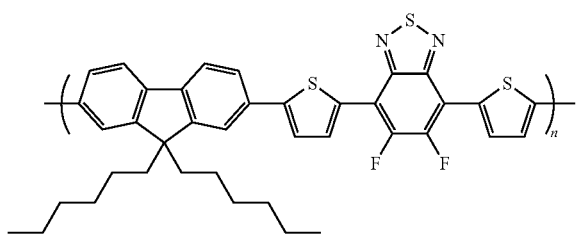
[Formula 2-c]
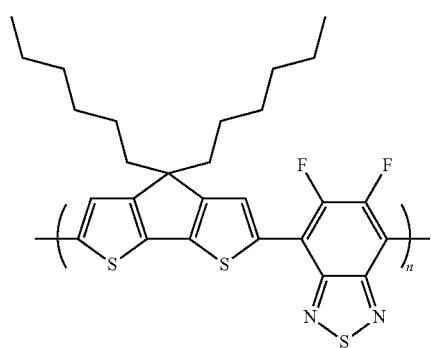
[Formula 2-d]
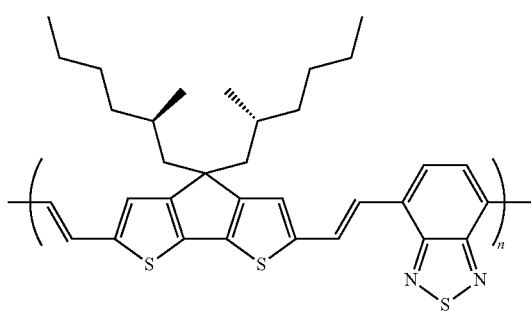

[Formula 2-e]

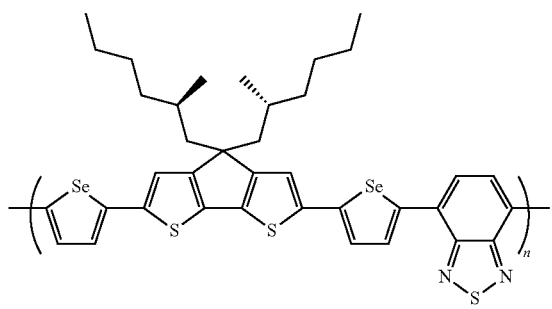

[Formula 2-f]

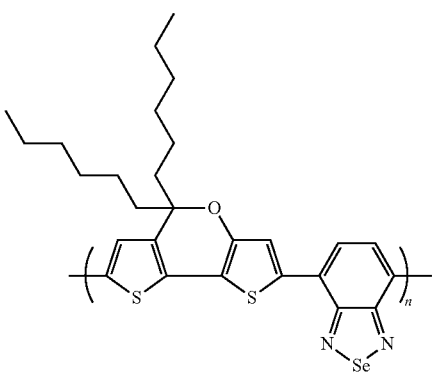

[Formula 2-g]

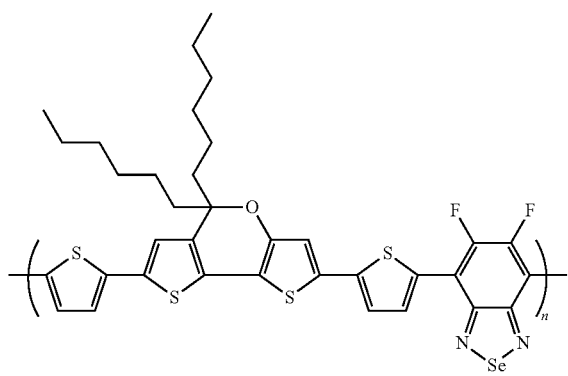

[Formula 3-a]

[Formula 4-a]

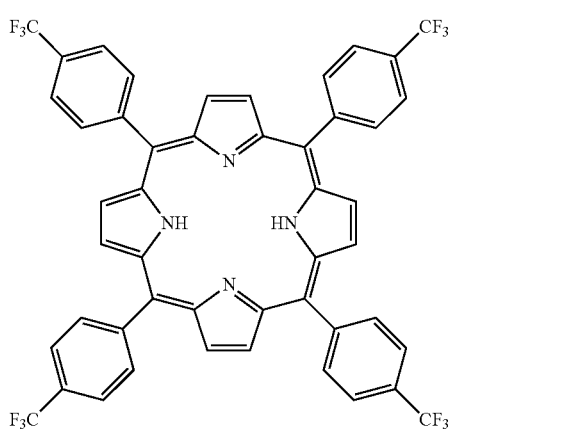

The best-grade reagents such as reactants, solvents, and salts required for the experiments were purchased from Sigma-Aldrich Co., Ltd., and used.

Example 1

7 mg of a fluorescence compound of Formula 1-a was dissolved in 0.1 g of methylene chloride, and then the resulting solution was stirred at room temperature for 10 minutes. 0.1 g of TBAPF$_6$ as an electrolyte salt was added to the composition to prepare an electrolyte. And then, a three-electrode device composed of the ITO glass working electrode, the Ag wire, and the ITO glass counter electrode, which were previously described, was manufactured. The device, which has a spacer having a thickness of 0.3 nm between the working electrode and the counter electrode and being 2 cm wide by 2 cm long, was manufactured. About 20 μl of the electrolyte composition was injected into the ITO glass device [resistance ~13 ohm (Ω)], and then the electrolyte injection port was blocked with an epoxy glue to manufactured an electro-fluorescence device. A 830-nm infrared fluorescence was exhibited by performing irradiation with 780-nm diode laser on the thin film prepared, and the maximum wavelength was 900 nm.

Figure 4:
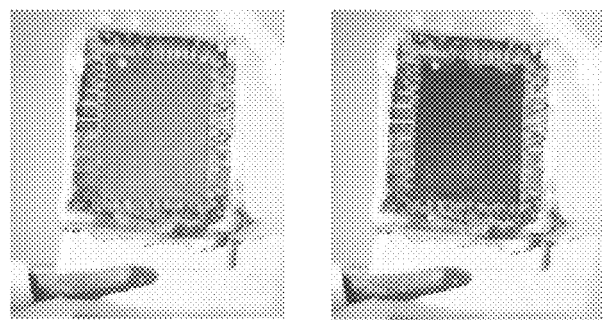
FIG. 4 is a photograph illustrating an infrared image of an infrared modulating fluorescence device according to Example 1.

Under the optimal switching conditions, the switching on and off of infrared fluorescence was exhibited at 1.1 V to −0.5 V, and the switching off of fluorescence and the switching on of fluorescence were observed at 1.1 V and −0.5 V, respectively. In FIG. 4, the switching off and on of fluorescence were confirmed with camera images measured by a visible light filter (<720 nm elimination, Kenko PRO1 Digital R72).

Examples 2 to 7

The experiment was performed in the same manner as in Example 1, but the reactants and the solvents to be used, the reaction conditions, the results and the like are shown in the following Table 1.

TABLE 1

| Example | Fluorescence layer composition | | Preparation Conditions of fluorescence layer | Device type | Thickness of fluorescence layer (μm) | Fluorescence wavelength (nm) |
|---|---|---|---|---|---|---|
| | Electro-fluorescence material (g) | Additive (g) | | | | |
| 2 | Formula 1-a (0.07) | Acetonitrile (8), TBAPF$_6$ (0.5) | Injection of Electrolyte Solution | Two-electrode device | 240 | 830 |
| 3 | Formula 1-b (0.1) | PEGDA [Mw 700] (5), LiTFSI (0.3), Darocure 1176 (0.03) | Bar-coating/curing | Transistor device | 120 | 890 |
| 4 | Formula 1-c (0.1) | PEGDMe [Mw 550] (5), LiTFSI (0.3) | Injection of Electrolyte Solution | Three-electrode device | 240 | 740 |
| 5 | Formula 1-d (0.25) | PEGDMe [Mw 550] (5), MPEGM [Mw 750] (0.75), TATT (0.18), TBAPF$_6$ (0.5), TBAI (1), I$_2$ (0.07) | Bar-coating/curing | Transistor device | 240 | 760 |
| 6 | Formula 1-e (0.25) | PEGDA [Mw 700] (5), LiTFSI (0.3), Darocure 1176 (0.15), Irgacure (0.075) | Bar-coating/curing | Three-electrode device | 360 | 820 |
| 7 | Formula 1-f (0.1) | Chloroform (8), TBAPF$_6$ (0.5) | Injection of Electrolyte Solution | Three-electrode device | 240 | 830 |

Example 8

10 mg of a fluorescence compound of Formula 2-a was dissolved in 1 g of chloroform, and then the resulting solution was stirred at room temperature for 24 hours to prepare a fluorescence composition. And then, the composition was applied on ITO glass while being rotated at 1,600 rpm using a spin coater. As a result, a thin film having a thickness of 100 nm was prepared, and a near-infrared light fluorescence with a maximum fluorescence intensity wavelength of 670 nm and a maximum fluorescence wavelength of 820 nm was exhibited by an incident light with a wavelength of 490 nm. And then, ITO glass [resistance ~13 ohm (Ω)] on which the fluorescence thin film composition was applied was dried on a hot plate at 100° C. for 10 minutes to prepare a thin film. And then, a three-electrode device composed of the ITO glass, on which the above-described fluorescence thin film was applied, as a working electrode, an Ag wire as a reference electrode, and another ITO glass as a counter electrode was manufactured. The device, which has a spacer having a thickness of 0.3 μm between the working electrode and the counter electrode and being 2 cm wide by 2 cm long, was manufactured.

About 20 μl of an electrolyte prepared by mixing 5 g of PEGEMe (molecular weight 550) and 0.3 g of LiTFSI was injected into the device, and then the electrolyte injection port was blocked with an epoxy glue to manufacture an electro-fluorescence device. Under the optimal switching conditions, the switching off of the infrared fluorescence was exhibited at 1.5 V, and the switching on of the fluorescence was observed at 0 V.

Examples 9 to 15

The experiment was performed in the same manner as in Example 8, but the reactants and the solvents to be used, the manufacturing conditions, the results and the like are shown in the following Table 2.

TABLE 2

| Example | Fluorescence thin film composition (g) | Electrolyte Composition (g) | Manufacturing conditions of electrolyte layer | Device type | Fluorescence wavelength (nm) |
|---|---|---|---|---|---|
| 9 | Formula 2-a (0.01) + Formula 2-b (0.01) | Acetonitrile (8), TBAPF$_6$ (0.5) | Injection of Electrolyte Solution | Two-electrode device | 670, 700 |
| 10 | Formula 2-b (0.01) + PMMA (0.02) | PEGDA [Mw 700] (5), LiTFSI (0.3), Darocure 1176 (0.03) | Bar-coating/curing | Transistor device | 700 |
| 11 | Formula 2-c (0.01) | PEGDMe [Mw 550] (5), LiTFSI (0.3) | Injection of Electrolyte Solution | Three-electrode device | 750 |

TABLE 2-continued

| Example | Fluorescence thin film composition (g) | Electrolyte Composition (g) | Manufacturing conditions of electrolyte layer | Device type | Fluorescence wavelength (nm) |
|---|---|---|---|---|---|
| 12 | Formula 2-d (0.01) | PEGDMe [Mw 550] (5), MPEGM [Mw 750] (0.75), TATT (0.18), TBAPF$_6$ (0.5), TBAI (1), I$_2$ (0.07) | Bar-coating/ curing | Transistor device | 800 |
| 13 | Formula 2-e (0.01) + PS (0.02) | PEGDA [Mw 700] (5), LiTFSI (0.3), Darocure 1176 (0.15), Irgacure (0.075) | Bar-coating/ curing | Three- electrode device | 820 |
| 14 | Formula 2-f (0.01) | Formula 1-c (0.07), Propylene carbonate (8), LiTFSI (0.4) | Injection of Electrolyte Solution | Three- electrode device | 740, 820 |
| 15 | Formula 2-g (0.01) | Formula 1-f (0.05), Propylene carbonate (8), TBAP (0.4) | Injection of Electrolyte Solution | Three- electrode device | 830 |

What is claimed is:

1. An electro-fluorescence device comprising:
a first electrode;
a second electrode disposed apart from the first electrode; and
an electrolyte layer disposed between the first electrode and the second electrode, and comprising an infrared fluorescence compound,
wherein the infrared fluorescence compound comprises a compound represented by the following Formula 1-a:

[Formula 1-a]

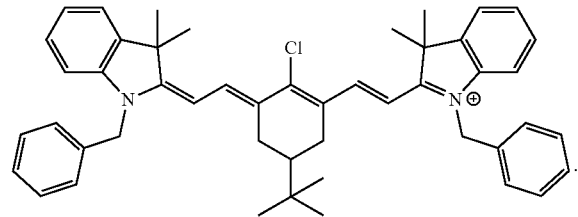

2. An electro-fluorescence device, comprising:
a first electrode;
a second electrode disposed apart from the first electrode;
a reference electrode disposed between the first electrode and the second electrode; and
an electrolyte layer disposed between the first electrode and the second electrode, and comprising an infrared fluorescence compound,
wherein the infrared fluorescence compound comprises a compound represented by the following Formula 1-a:

[Formula 1-a]

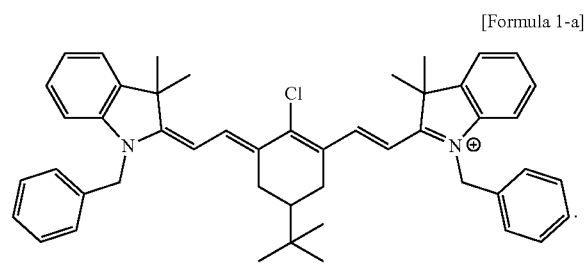 [SMILES: CC1(C)C(/C=C/C2=C(Cl)C(=C/C=C3/N(Cc4ccccc4)c4ccccc4C3(C)C)/CC(C(C)(C)C)C2)=[N+](Cc2ccccc2)c2ccccc21]

3. An electro-fluorescence device as a transistor-type structure, comprising:

a substrate;
a first electrode formed on the substrate;
a second electrode formed on the substrate and disposed apart from the first electrode;
a third electrode formed on the substrate and disposed apart from the first electrode and the second electrode; and
an electrolyte layer disposed among the first electrode, the second electrode, and the third electrode, and comprising an infrared fluorescence compound,
wherein the infrared fluorescence compound comprises a compound represented by the following Formula 1-a:

[Formula 1-a]

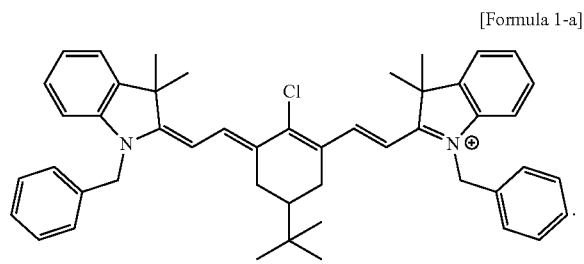 [SMILES: CC1(C)C(/C=C/C2=C(Cl)C(=C/C=C3/N(Cc4ccccc4)c4ccccc4C3(C)C)/CC(C(C)(C)C)C2)=[N+](Cc2ccccc2)c2ccccc21]

4. The electro-fluorescence device of claim 1, wherein the electrolyte layer comprises one infrared fluorescence compound or a mixture of a plurality of infrared fluorescence compounds, and an electrolyte.

5. The electro-fluorescence device of claim 1, wherein the electrolyte layer comprises an infrared fluorescence compound and an electro-active material.

6. The electro-fluorescence device of claim 1, wherein the electrolyte layer is in a form of a thin film.

7. The electro-fluorescence device of claim 1, wherein the electrolyte layer comprises an electrolyte salt selected from tetrabutylammonium hexafluorophosphate (TBAPF$_6$, n-Bu$_4$NPF$_6$), lithium bistrifluoromethanesulfonimidate (LiTFSI, C$_2$F$_6$LiNO$_4$S$_2$), tetrabutylammonium iodide (TBAI), tetrabutylammonium perchlorate (TBAP, n-Bu$_4$NClO$_4$), lithium perchlorate (LiClO$_4$), sodium tetrafluoroborate (NaBF$_4$), lithium hexafluorophosphate (LiPF$_6$), lithium tetrafluoroborate (LiBF$_4$), lithium trifluoromethanesulfonate (LiCF$_3$SO$_3$), potassium hexacyanoferrate (K$_4$Fe(CN)$_6$), and lithium bisperfluoroethane sulfonyl imide (LiBETI, LiN(SO$_2$C$_2$F$_5$)$_2$).

8. The electro-fluorescence device of claim 1, wherein the electrolyte layer comprises an electro-active compound selected from benzoquinone, ferrocene, hydrobenzoquinone, naphthoquinone, $I_2$, and $KI_3$.

9. The electro-fluorescence device of claim 1, wherein the electrolyte layer comprises a solvent selected from methylene chloride, chloroform, acetonitrile, ethylene carbonate, propylene carbonate, tetrahydrofuran, butylene carbonate, polyethylene glycol, ethylene glycol, tetrachloroethene, styrene, alpha-methyl styrene, and xylene.

10. The electro-fluorescence device of claim 1, wherein the electrolyte layer comprises an organic material comprising an acryloyl group, an epoxy group, a vinyl group, or a methacryloyl group.

11. The electro-fluorescence device of claim 1, wherein the electro-fluorescence device controls an infrared signal by an oxidation-reduction reaction at a direct current or alternating current voltage within ±3 V.

12. The electro-fluorescence device of claim 1, wherein the electrolyte layer comprises a liquid electrolyte in which an electrolyte salt is dissolved, a gel electrolyte, a solid electrolyte, or a polyelectrolyte.

13. The electro-fluorescence device of claim 1, wherein two or more of the electro-fluorescence device constitute one pixel.

14. The electro-fluorescence device of claim 1, wherein the electro-fluorescence device repeats complete switching on and off of fluorescence.

15. The electro-fluorescence device of claim 1, wherein the electro fluorescence device does not represent the complete switching off and on, but represents a fluorescence intensity which is in an intermediate level.

* * * * *